Jan. 5, 1932.　　　H. R. HUMPHREY　　　1,839,483

VALVE MECHANISM

Filed May 5, 1930

INVENTOR
Hubert R. Humphrey
BY
Chappell Earl
ATTORNEYS

Patented Jan. 5, 1932

1,839,483

UNITED STATES PATENT OFFICE

HUBERT R. HUMPHREY, OF KALAMAZOO, MICHIGAN, ASSIGNOR TO GENERAL GAS LIGHT COMPANY, OF KALAMAZOO, MICHIGAN

VALVE MECHANISM

Application filed May 5, 1930. Serial No. 450,033.

The main objects of this invention are to provide an electrically operated valve mechanism for gas heaters and the like which is very positive in its operation, may be operated by a small solenoid or electro-magnet and is simple in structure.

Objects relating to details and economies of my invention will appear from the description to follow. The invention is defined and pointed out in the claims.

A structure which is a preferred embodiment of my invention is illustrated in the accompanying drawings, in which.

Figures 1, 2:
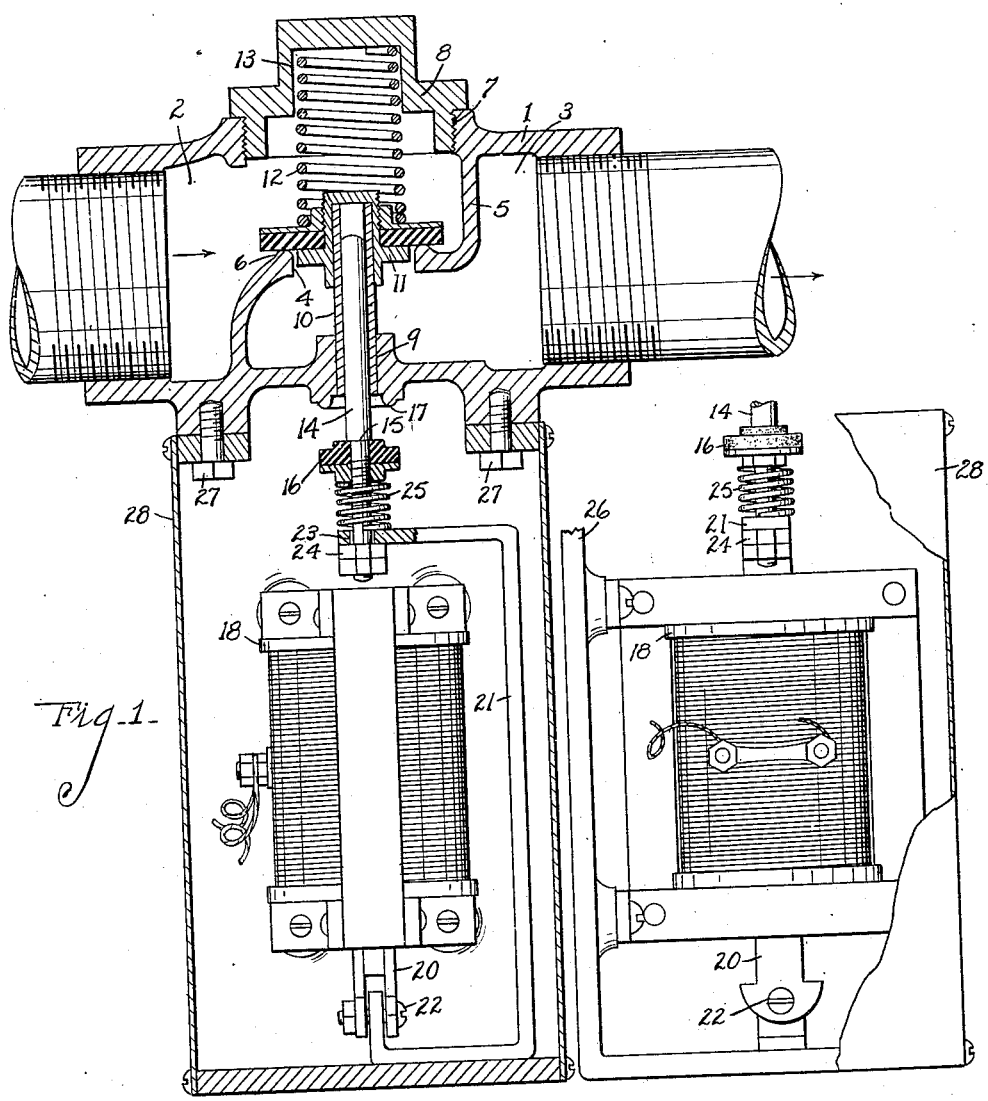
Fig. 1 is a fragmentary view partially in section of a valve mechanism embodying the feature of my invention.
Fig. 2 is a fragmentary view partially in section looking from the left of Fig. 1.

In the embodiment of my invention illustrated, I provide a valve casing 1 having an inlet 2 and a discharge 3 communicating through the port 4, this port being formed in a stepped partition 5.

The port is surrounded by an annular valve seat 6 facing an opening 7 in the side of the casing, this opening being closed by the threaded closure 8.

The casing is provided with a bore 9 centrally aligned with tht port 4, the tubular guide 10 being secured in this bore 9 to project centrally through the port.

The valve 11 is slidably mounted on this guide to coact with the valve seat 6. A coiled spring 12 urges the valve to its seat. This spring 12 is seated in a recess 13 in the cap 8.

The valve stem 14 is slidable in the guide 10 to coact with the valve. This stem is shouldered at 15 to provide a stop for the packing valve 16 which coacts with the outwardly facing packing valve seat 17 surrounding the stem.

The solenoid or electro-magnet 18 is provided with an armature 20 to which the yoke-shaped coupling member 21 is secured by means of the bolt 22. The upper arm of this coupling member has an opening 23 therein to receive the stem.

The nut 24 for the lower end of the stem constitutes a stop for the coupling member. A coiled spring 25 is arranged between the valve and the coupling member. This coiled spring is of a tension exceeding that of the spring 12 so that on the actuation of the solenoid, the valve 11 is opened, the packing valve being carried against its seat. The spring 25 will then yield to permit movement of the armature to the full end of its stroke.

The solenoid is mounted on a bracket 26 secured to the under-side of the valve housing at 27, a housing 28 preferably of sheet metal being secured to the bracket to enclose the parts below the valve casing.

My improved valve is very simple in structure. Little power is required to operate the same owing to the fact that there is no packing box which might be adjusted so as to render the device inoperative.

I have illustrated and described my improvements as I have embodied the same for use in gas heaters. It will be understood that they are readily adapted and desirable for use in various relations.

Having thus described my invention, what I claim as new and desire to secure by Letters Patent, is:

1. In a valve mechanism, the combination of a valve casing having an internal main valve port surrounded by an annular valve seat, said casing having a wall opening opposite said seat and an oppositely disposed outwardly-facing packing valve seat, a tubular valve guide mounted on said valve casing centrally of said packing valve seat to project through said port, a main valve slidably mounted on said guide to coact with said main valve seat, a spring acting to urge said main valve to its seat, a threaded closure for said opening in said valve casing recessed to receive the outer end of said spring, a valve stem slidably mounted within said guide to coact with said main valve and provided with an outwardly-facing stop, a packing valve mounted on said stem below said stop, a valve actuating solenoid, a coupling member connected to said solenoid and slidably engaged with said stem, and a coiled spring arranged between said packing valve and said coupling member, said spring being of a tension exceeding that of said main valve spring.

2. In a valve mechanism, the combination of a valve casing having an internal main valve port surrounded by an annular valve seat and an outwardly-facing packing valve seat, a tubular valve guide mounted on said valve casing centrally of said packing valve seat to project through said port, a main valve slidably mounted on said guide to coact with said main valve seat, a spring acting to urge said main valve to its seat, a valve stem slidably mounted within said guide to coact with said main valve and provided with an outwardly-facing stop, a packing valve mounted on said stem below said stop, a valve actuating solenoid, a coupling member connected to said solenoid and slidably engaged with said stem, and a coiled spring arranged between said packing valve and said coupling member, said spring being of a tension exceeding that of said main valve spring.

3. In a valve mechanism, the combination of a valve casing having an internal annular valve seat, said casing having a wall opening opposite said seat and an oppositely disposed outwardly-facing packing valve seat, a tubular valve guide mounted on said valve casing centrally of said valve seats, a main valve slidably mounted on said guide to coact with said main valve seat, a spring acting to urge said main valve to its seat, a closure for said opening in said valve casing recessed to receive the outer end of said spring, a valve stem slidably mounted within said guide to coact with said main valve and provided with an outwardly-facing stop, a packing valve mounted on said stem adjacent said stop to coact with said packing valve seat, an actuating member slidably engaged with said stem, and a spring arranged between said packing valve and said actuating member.

4. In a valve mechanism, the combination of a valve casing having an internal annular valve seat and an outwardly facing packing valve seat, a tubular valve guide mounted on said valve casing centrally of said valve seats, a main valve slidably mounted on said guide to coact with said main valve seat, a spring acting to urge said main valve to its seat, a valve stem slidably mounted within said guide to coact with said main valve and provided with an outwardly facing stop, a packing valve mounted on said stem adjacent said stop to coact with said packing valve seat, an actuating member slidably engaged with said stem, and a spring arranged between said packing valve and said actuating member.

5. In a valve mechanism, the combination of a valve casing provided with an internal valve seat, a valve coacting with said seat and provided with a seating spring, a tubular guide for said valve, a stem for said valve reciprocatingly mounted in said guide, there being a packing valve seat surrounding said stem, a packing member mounted on said stem, a valve actuating solenoid, a coupling member operatively associated with said solenoid and slidably engaged with said stem, and a coiled spring arranged between said packing member and said coupling member, said spring being of a tension exceeding that of the main valve spring.

6. In a valve mechanism, the combination of a valve casing provided with an internal valve seat, a valve coacting with said seat and provided with a seating spring, a tubular guide for said valve, a stem for said valve reciprocatingly mounted in said guide, said valve casing being provided with a packing valve seat surrounding said stem, a packing valve mounted on said stem, an actuating member, and a spring between said packing member and said actuating member, said spring being of a tension exceeding that of the main valve spring.

In witness whereof I have hereunto set my hand.

HUBERT R. HUMPHREY.